(12) United States Patent
Vorobiov et al.

(10) Patent No.: US 11,317,025 B1
(45) Date of Patent: Apr. 26, 2022

(54) MOVIE CAMERA STABILIZATION AND CONTROL SYSTEM

(71) Applicant: Sergii Tartyshnikov, Kyiv (UA)

(72) Inventors: Oleksii Vorobiov, Kyiv (UA); Sergii Tartyshnikov, Kyiv (UA)

(*) Notice: Subject to any disclaimer, the term of this patent is extended or adjusted under 35 U.S.C. 154(b) by 0 days.

(21) Appl. No.: 17/516,881

(22) Filed: Nov. 2, 2021

(51) Int. Cl.
*H04N 5/232* (2006.01)

(52) U.S. Cl.
CPC ..... *H04N 5/23258* (2013.01); *H04N 5/23287* (2013.01)

(58) Field of Classification Search
CPC ........... H04N 5/23258; H04N 5/23287; H04N 5/2254; H04N 5/2251; H04N 5/23296; H04N 5/2253; H04N 5/2328; H04N 5/2259; F16C 11/04; F16M 13/02; F16M 13/027; F16M 11/10; F16M 11/12; F16M 11/18; F16M 11/2014; G02B 7/001; G02B 27/644; G02B 27/64; G01C 21/18; G03B 15/006; G03B 37/00
USPC ...................................................... 348/208.8
See application file for complete search history.

(56) References Cited

U.S. PATENT DOCUMENTS

| | | | | |
|---|---|---|---|---|
| 7,000,883 B2 * | 2/2006 | Mercadal | ............... | F16M 11/18 396/428 |
| 7,671,311 B2 * | 3/2010 | Ellison | ................... | G03B 17/55 74/5.34 |
| 8,752,969 B1 * | 6/2014 | Kane | ..................... | G02B 26/101 359/872 |
| 9,094,605 B2 * | 7/2015 | Chapman | ............... | F16M 11/18 |
| 9,531,928 B2 * | 12/2016 | Ellison | ................... | G02B 7/001 |
| 10,455,158 B2 * | 10/2019 | Ristroph | ............ | H04N 5/23258 |
| 10,965,875 B2 * | 3/2021 | Guo | .................... | H04N 5/23299 |
| 10,976,647 B2 * | 4/2021 | Liao | ........................ | G03B 5/02 |
| 11,036,228 B2 * | 6/2021 | Koyama | .............. | G05D 1/0094 |
| 2007/0194170 A1 * | 8/2007 | Ellison | .................. | H04N 5/332 244/3.1 |
| 2011/0304736 A1 * | 12/2011 | Evans | ...................... | H04N 5/33 250/203.1 |
| 2016/0014309 A1 * | 1/2016 | Ellison | ................... | F16M 13/02 248/550 |
| 2018/0113462 A1 * | 4/2018 | Fenn | ...................... | F16M 13/02 |
| 2018/0146126 A1 * | 5/2018 | Tian | ..................... | G02B 27/644 |
| 2018/0255247 A1 * | 9/2018 | Ristroph | ............. | H04N 5/2254 |
| 2019/0113922 A1 * | 4/2019 | Koyama | ........... | F16M 11/2014 |
| 2019/0162358 A1 * | 5/2019 | Wang | .................... | B64C 39/024 |
| 2020/0003357 A1 * | 1/2020 | Su | .......................... | F16M 11/18 |
| 2020/0053290 A1 * | 2/2020 | Ristroph | ........... | H04N 5/23296 |
| 2020/0096844 A1 * | 3/2020 | Liao | .................... | G03B 17/561 |

* cited by examiner

*Primary Examiner* — Pritham D Prabhakher
(74) *Attorney, Agent, or Firm* — Nadya Reingand; Yan Hankin

(57) ABSTRACT

The invention relates to movie camera stabilization and control systems in an inertial space, based on classic four-axes gimbal structure, that comprises four frames which are successively connected to each other and have mutually perpendicular rotation axes. In proposed embodiment camera orientation is controlled by three inner gimbal's frames that are controlled by first control sub-system and the first gimbal frame is controlled by second control subsystem. Proposed control subsystems are simple in realization, independent from each other and together with four-axes gimbal provide unrestricted orientation control of the movie camera in inertial space regardless of the gimbal mounting point orientation.

2 Claims, 2 Drawing Sheets

MOVIE CAMERA STABILIZATION AND CONTROL SYSTEM

CROSS-REFERENCE TO RELATED APPLICATIONS

The present patent application claims priority to Ukrainian patent application a202104849 filed Aug. 27, 2021, which is fully incorporated herein by reference.

TECHNICAL FIELD OF THE INVENTION

The invention relates to movie camera stabilization and control systems in an inertial space. The invention may be used to control an orientation and to stabilize a payload, in particular, of gimbal-based motion picture cameras which are widely used in the modern movie industry.

BACKGROUND OF THE INVENTION

The prior art discloses a stabilization system using a three-degree-of-freedom gimbal, see Lysov, A. N., Theory of gyroscopic stabilizers/A. N. Lysov, A. A. Lysova.—Chelyabinsk: Publishing center YUrGU, 2009.-115 p. The known stabilization system has a number of limitations which are peculiar to three-stage gimbals. These limitations find expression in the loss of one of the degrees of freedom in certain orientations of the gimbal, as well as in the need to create excessively large angular accelerations of an outer frame of the gimbal in orientations which are close to the loss of one of the degrees of freedom. Furthermore, to correctly control the camera orientation, it is necessary for the orientation of a first axis of the gimbal to be close to a vertical, which is not convenient in the most cases and reduces the accuracy of the movie camera stabilization under the conditions of significant dynamic loads.

A classical solution to avoid the loss of one of the degrees of freedom in the gimbal-based orientation systems is to use a fourth (redundant) degree of freedom. Structural characteristics of four-axis gimbals and recommendations for building their control systems are provided in literature sources, such as the following one: Kenneth G. McConnel. Kinematic of a Three-Axis Gimbal System. In book. "Developments in theoretical and applied mechanics" edited by W. A. Shaw, Volume 3, Proceedings of the Third Southeastern Conference on Theoretical and Applied Mechanics, Columbia, South California, March 31-Apr. 1, 1966. Pergamon press P. 515-543.

An analogue for the invention is a gimbal-based stabilization system known from US 20160014309 A1, which provides an electro-mechanical imbalance compensator to enhance the stabilization accuracy. The compensator compensates for the camera imbalance relative to axes of a gimbal by moving an additional mass. The drawback of said analogue is the complexity of the technical implementation of the imbalance compensation mechanism and the need to adjust it depending on a camera type, which casts doubt on its use in real systems.

Also, one of analogues for the invention is a stabilization system known from U.S. Pat. No. 7,000,883 B2. In this system, the embodiment of a two-axis system for stabilizing movie cameras for aircrafts is disclosed, which resolves the problem of the loss of one of degrees of freedom due to an additional rotation axis. However, this and the above-mentioned analogues have a number of limitations. More specifically, for their correct operation, it is necessary for the first axis to be in a vertical plane relative to a ground surface. Also, the problem of the full stabilization and unlimited control of the camera rotation is not discussed and solved.

Another analogue for the claimed invention is a movie camera stabilization system based on a four-degree-of-freedom gimbal, which is known from U.S. Ser. No. 10/455, 158 B2. The movie camera stabilization system consists of the gimbal and a control system. The gimbal is made in the form of four frames which are successively connected to each other and have mutually perpendicular rotation axes. The orientation control system of this technical solution consists of two loops: inner and outer. The inner loop of the control system is intended to control the orientation and stabilization of the camera in an inertial space. The outer loop of the control system is responsible for controlling a torque of a first axis of the gimbal so as to avoid interfering the camera field of view with the structural elements, as well as to prevent the gimbal from losing one of the degrees of freedom. The outer loop of the control system is subordinated to the inner loop, and it is further partially responsible for payload stabilization. The main drawback of this solution is the complexity of the operation algorithm and the system adjustment. It is caused by the presence of dynamic conversions in the control system when determining control torques of motors. This, in turn, requires complex calculations and the determination of inertia moments of the elements of the gimbal and the movie camera, which is very difficult to accomplish in practice.

SUMMARY OF THE INVENTION

The invention is based on the task of improving a movie camera stabilization and control system in an inertial space by means of a four-degree-of-freedom gimbal such that the design of a control system does not require dynamic conversions to determine control torques of motors. This would allow one to significantly reduce a number of calculation operations and to simplify the adjustment of the movie camera stabilization and control system. Consequently, technical tasks of the invention are also as follows: expanding the usage field of the movie camera stabilization and control system in a combination with the gimbal and the movie camera due to the possibility of their arbitrary mounting, in particular, on cinematographic telescopic cranes, as well as providing the possibility of performing rotations of the movie camera around an arbitrary axis in the space in an unlimited fashion.

The above-posed task is resolved by a movie camera stabilization and control system consisting of: a gimbal 17 that comprises four frames 18, 19, 20, 21 which are successively connected to each other and have mutually perpendicular rotation axes, four encoders 2, 3, 4, 5, four electrical motors 28, 29, 30, 31 which are mounted on the rotation axes of the frames 18, 19, 20, 21, an inertial measurement unit 1 that is mounted on a platform 23 for mounting a movie camera 22, an operator console unit 6, and a control system.

What is novel is that the control system consists of two individual sub-systems, namely: a first sub-system and a second sub-system. The first sub-system is used for stabilizing and controlling an angular velocity of the movie camera 22 in the inertial space by means of the three inner frames 19, 20, 21 of the gimbal 17. The first sub-system is made in the form of three control loops based on proportional-integral-derivative (PID)-controllers to minimize a projection of a sum of reference angular velocities and angular velocities measured by the inertial measurement unit 1 on the axis of the corresponding motor. The second sub-system is made in the form of a cascaded control loop for controlling a relative velocity of the first frame 18 based on three PID-controllers. The PID controllers comprise: a first PID-controller that is a controller for minimizing a deviation of the third frame 20 from its central position and has a gain that is variable according to a cosinusoidal law depending on a relative angular position of the second frame 19 of the gimbal 17, a second PID-controller that is a controller for minimizing a relative angular velocity of the third frame 20, and a third PID-controller that is a controller for controlling a relative angular velocity of the first frame 18. Said two individual sub-systems do not require dynamic conversions when calculating the reference torques of all the motors 28, 29, 30, 31 and information about moments of inertia of the gimbal 17 and the movie camera 22.

The movie camera stabilization and control system is also characterized by the following features which elaborate and clarify the set of features of the first claim.

The movie camera stabilization and control system further comprises: a reference angular velocity calculation unit 7, an angular velocity conversion unit 10, an angular velocity stabilization unit 11, control system units 12, 13, 14 of the motors 29, 30, and 31 of a second axis 25, a third axis 26, and a fourth axis 27 of the gimbal 17, respectively, an orientation control unit 8,—which are all related to the first sub-system for stabilizing and controlling the angular velocity of the movie camera 22 in the inertial space. The inertial measurement unit 1 provides the angular velocity conversion unit 10 with information about angular velocities in a coordinate system that is associated with the movie camera 22, as well as with data about an orientation of the movie camera 22 in an inertial coordinate system (ICS). The encoders 2, 3, 4, 5 are mounted on the axes 24, 25, 26, 27 of the gimbal 17 and determine an orientation of a camera coordinate system (CCS) relative to a motors coordinate system (MCS) according to angular positions of the frames 15, 16, 17, 18 of the gimbal 17 relative to each other. The MCS is defined as a coordinate system (CS) having axes that coincide with a current position of the second axis 25, the third axis 26, and the fourth axis 27 of the gimbal 17. Values of projections of the angular velocities on the axes of the CCS which are set by the operator console unit 6 are calculated in the reference angular velocity calculation unit 7, and these projections are summed in an adder unit 9 with the corresponding angular velocities measured in the CCS by the inertial measurement unit 1. Projections of the corresponding values calculated in the adder unit 9 on the axis of the MCS are calculated in the angular velocity conversion unit 10 using data about angular positions of the frames 19, 20, 21 of the gimbal 17 relative to each other, which are measured by the encoders 3, 4, 5. The angular velocity stabilization unit 11 receives, as input information, projections of the angular velocities calculated in the angular velocity conversion unit 10 and determines reference torques for the control system units 12, 13, 14 of the corresponding motors 29, 30, and 31 of the second axis 25, the third axis 26, and the fourth axis 27 of the gimbal 17, respectively. The angular velocity stabilization unit 11 consists of three independent control loops based on PID-controllers which minimize a deviation of input signals from an output of the angular velocity conversion unit 10. The orientation stabilization unit 8 is auxiliary and forms additional correction signals in the form of reference angular velocities in the CCS based on a difference between current and reference orientation values which are summed with the corresponding measured angular velocities in the adder unit 9. The orientation of the movie camera 22 is calculated in the inertial measurement unit 1 using readings of three gyroscope sensors and three accelerometers which have sensitivity axes that coincide with the CCS. The control system unit 15 of the first frame 18 of the gimbal 17 and the control system unit 16 of the motor 28 of the first axis 24 are related to the second individual sub-system. The control unit 15 of the first frame 18 of the gimbal 17 is a cascade control loop that comprises three PID-controllers comprising: a first PID-controller that minimizes a deviation of the third frame 20 from its central position, a second PID-controller that minimizes the relative angular velocity of the third frame 20, and a third PID-controller that is a controller of the relative velocity of the first frame 18. The first PID-controller has a gain that is variable according to the cosinusoidal law depending on the relative angular position of the second frame 19. An output value of the control system unit 15 of the first frame 18 of the gimbal 17 is a reference torque for the control system unit 16 of the motor 28 of the first axis 24.

The distinguishing features of the invention allow one to resolve the above-posed task due to the fact that the control system in the proposed movie camera stabilization and control system consists of the two individual sub-systems which are independent from each other and do not require dynamic conversions when calculating the reference torques of all the motors 28, 29, 30, 31 and information about moments of inertia of the gimbal 17 and the movie camera 22. The lack of dynamic and complex kinematic conversions in the control system significantly increases its operation speed and implementation simplicity. The sub-system for stabilizing and controlling the angular velocity of the movie camera 22 in the inertial space is represented by the three control loops based on the PID-controllers, each of them minimizes the projection of the sum of the reference angular velocities and the angular velocities measured by the inertial measurement unit 1 on the axis of the corresponding motor. Therefore, by operating in the coordinate system of the axes of the motors, it is possible to achieve desired angular velocities of the movie camera 22 in the inertial coordinate system. The output of each control loop (based on the PID-controllers) is a torque reference signal for the control system of the corresponding motor. The advantage of such a solution is that there is no need to control intermediate variables, such as angles of rotation of the frames of the gimbal 17 and their relative angular velocities. This makes the stabilization system not only simpler as compared to the analogues, but increases its dynamic and accuracy characteristics.

BRIEF DESCRIPTION OF THE DRAWINGS

The practical implementation and industrial applicability of the movie camera stabilization and control system is explained by schematic structural drawings, in which.

LISTING OF REFERENCE NUMERALS

Figure 1:
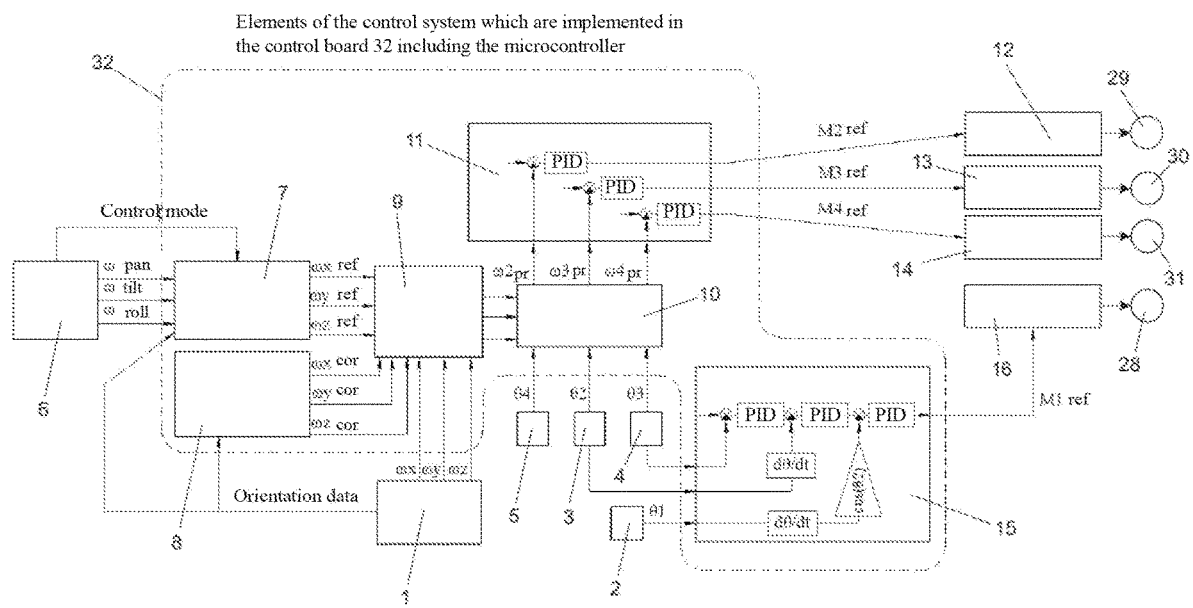
FIG. 1 is a diagram of a control system of a four-degree-of-freedom gimbal 17 for stabilizing and controlling a movie camera 22 in an inertial space.

Structural elements of the invention are designated by the following reference numerals:
1—inertial measurement unit (IN/U);
2, 3, 4, 5—encoders for measuring angular positions of frames 18, 19, 20, 21 of a gimbal 17 relative to each other;
6—operator console unit;

7—reference angular velocity calculation unit (implemented in a microcontroller of a control board 32);

8—orientation control/stabilization unit (implemented in the microcontroller of the control board 32);

9—adder unit (implemented in the microcontroller of the control board 32);

10—angular velocity conversion unit (implemented in the microcontroller of the control board 32);

11—angular velocity stabilization unit (implemented in the microcontroller of the control board 32);

12, 13, 14—control system units of motors of a second axis 25, a third axis 26, and a fourth axis 27, respectively (each unit is an individual control board having an individual microcontroller—drivers of the motors 29, 30, 31);

15—control system unit of the first frame 18 of the gimbal 17 (implemented in the microcontroller of the control board 32);

16—control system unit of the motor 28 of a first axis 24 (the individual control board of the motor 28);

17—gimbal;

18, 19, 20, 21—first, second, third, and fourth frames;

22—movie camera;

23—platform for mounting the movie camera 22;

24, 25, 26, 27—first, second, third, and fourth axes;

28, 29, 30, 31—corresponding motors of the first, second, third, and fourth axes;

32—control board including the microcontroller.

DETAILED DESCRIPTION OF THE INVENTION

Figure 2:
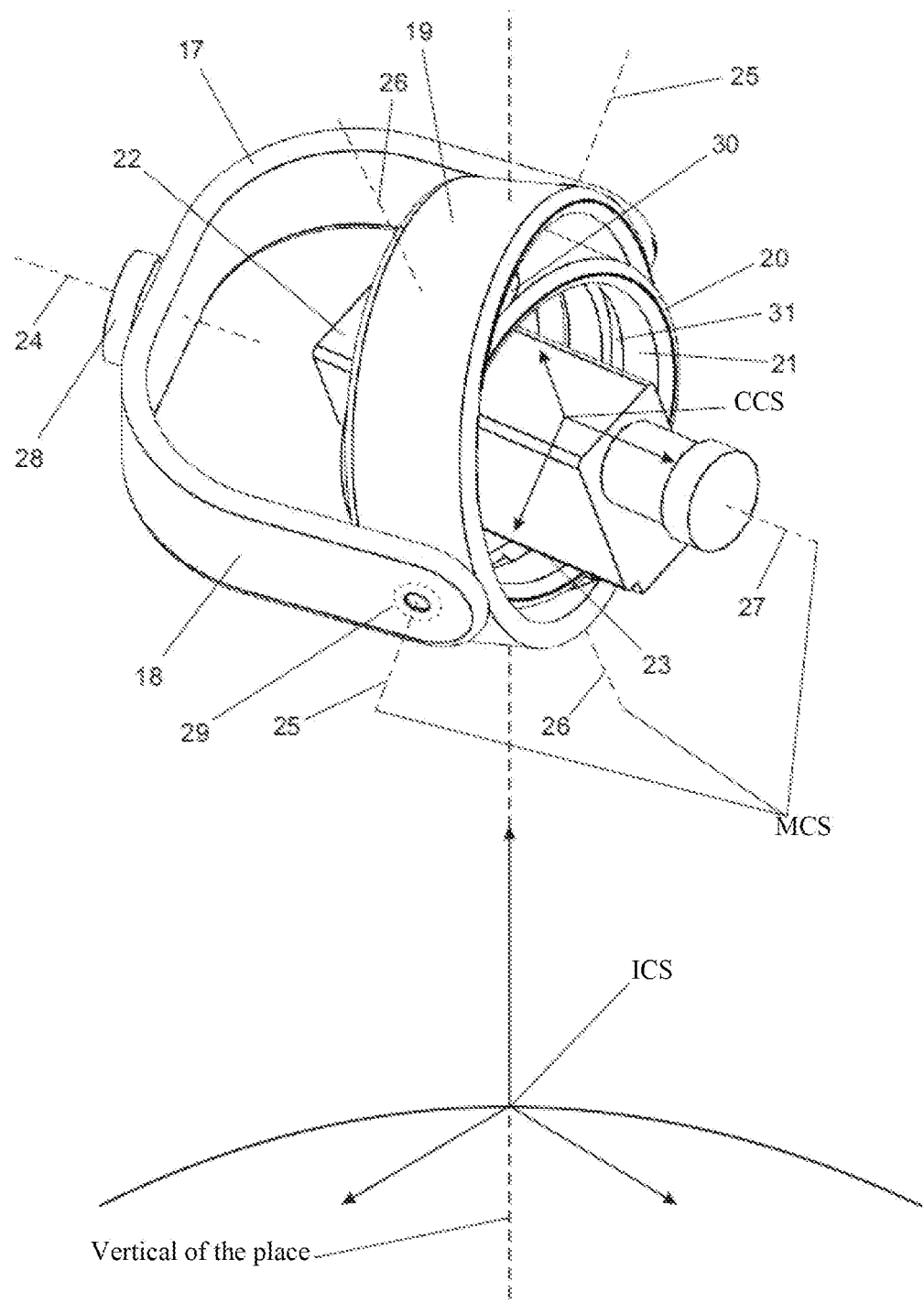
FIG. 2 is a diagram of the four-degree-of-freedom gimbal 17.

A gimbal 17 consists of four frames 18 (a first frame), 19 (a second frame), 20 (a third frame), 21 (a fourth frame) which are successively connected to each other and have mutually perpendicular rotation axes (FIG. 2). In order to meet the conditions for minimizing the entry of the structure elements into the field of view of a movie camera 22 (FIG. 2) during operation and to provide structural rigidity, the frames 18, 19, 20, 21 of the gimbal 17 are designed as follows.

The first frame 18 (see FIG. 2) is made open and C-shaped. The second frame 19 has a circular or a circular-like closed shape. The third frame 20 and the fourth frame 21 represent a cylindrical structure. The third frame 20 has a greater diameter relative to a diameter of the fourth frame 21. The frames 20 (the third one) and 21 (the fourth one) are fixed one relative to another such that a rotation axis 27 of the fourth frame 21 coincides with a geometrical axis 26 of the third frame 20. Corresponding encoders 2, 3, 4, 5 (FIG. 1) and motors 28, 29, 30, 31 are arranged directly on the rotation axes of the frames 18, 19, 20, 21 (FIG. 2). The motors 28, 29, 30, 31 are mounted within the structure elements of the gimbal 17 (mounting places for the motors 28, 29, 30, 31 are shown in FIG. 2). To provide balance conditions for the frames 18 and 19 relative to their rotation axes, the encoders 2 and 3 together with electronic modules of control system units 12 and 13 of the motors (FIG. 1) are arranged from an opposite side relative to the corresponding motors 29 and 30.

The control system comprises an inertial measurement unit 1, the encoders 2, 3, 4, 5, an adder unit 9, an angular velocity conversion unit 10, an angular velocity stabilization unit 11, control system units 12, 13, and 14 of the motors of a second axis 25, the third axis 26, and the fourth axis 27, respectively, an orientation stabilization unit 8, a reference angular velocity calculation unit 7, a control unit 15 of the first frame of the gimbal, a control unit 16 of the motor of the first axis, and an operator console unit 6 (FIG. 1). In this particular embodiment of the movie camera stabilization and control system, the calculation units 7, 8, 9, 10, 11, 15, and PID-controllers are implemented in a microcontroller of a control board 32 (FIG. 1) that is arranged in a housing of the first axis of the gimbal 17 (it should be noted that the control board 32 may be arranged in other places of the gimbal 17). The control system units 12, 13, 14, and 16 of the motors are individual electronic modules (drivers) that allow one to control the torque of the corresponding motor.

The stabilization and control system operates as follows. The stabilization and control of the movie camera 22 (that is mounted on the mounting platform 23, FIG. 2) is performed in the inertial coordinate system (ICS, see FIG. 2), where the direction of a vertical axis coincides with the direction of gravity. The inertial measurement unit 1 (that is mounted on the mounting platform 23) provides the unit 10 with information about angular velocities $\omega x$, $\omega y$, and $\omega z$ (FIG. 1) in the coordinate system that is associated with the movie camera 22 (CCS is the coordinate system of the movie camera 22, see FIG. 2), as well as with data about the orientation of the movie camera 22 in the ICS. The stabilization and control of the orientation of the movie camera 22 are implemented by the second axis 25, the third axis 26, and the fourth axis 27, while the first axis 24 is controlled in such a manner as to avoid large deviation of the third frame 20 of the gimbal 17 from its central position. In this approach, the rotation of the first frame 18 is just an angular disturbance for the orientation stabilization system (implemented by the second axis 25, the third axis 26, and the fourth axis 27), that is compensated to maintain the reference orientation of the movie camera 22. During the operation of the device (the gimbal 17), the motors coordinate system (MCS) is defined as a CS having axes that coincide with the current position of the axes 25 (the second axis), 26 (the third axis), and 27 (the fourth axis) of the gimbal 17, and the orientation of the CCS relative to the MCS is determined based on the angular positions of the frames 19, 20, 21 of the gimbal 17 relative to each other by means of the encoders 3, 4, 5 which are mounted on the axes 25, 26, 27 of the gimbal 17. The orientation of the movie camera 22 may be provided in various forms, such, e.g., as quaternions, Euler angles or a direction cosine matrix. Depending on the coordinate system selected for control, in the reference angular velocity calculation unit 7, projections $\omega x\_ref$, $\omega y\_ref$, and $\omega z\_ref$ (FIG. 1) of reference angular velocities $\omega\_pan$, $\omega\_tilt$, and $\omega\_roll$ (FIG. 1) on the CCS are calculated, and they are summed in the adder unit 9 with the corresponding angular velocities $\omega x$, $\omega y$, and $\omega z$ measured in the CCS by the inertial measurement unit 1. By using angular positions values $\theta 2$, $\theta 3$, $\theta 4$ (FIG. 1) of the frames 19, 20, 21 of the gimbal 17 which are measured by the encoders 3, 4, 5, projections $\omega 2\_pr$, $\omega 3\_pr$, and $\omega 4\_pr$ (FIG. 1) of the corresponding angular velocities calculated in the adder unit 9 on the axes MCS are calculated in the angular velocity conversion unit 10. The angular velocity stabilization unit 11 receives, as input information, the projections $\omega 2\_pr$, $\omega 3\_pr$, and $\omega 4\_pr$ of the angular velocities calculated in the angular velocity conversion unit 10, and calculates reference torques M2_ref, M3_ref, and M4_ref (FIG. 1) for the control system units 12, 13, 14 of the corresponding motors 29, 30, 31 of the second axis 25, the third axis 26, and the fourth axis 27 of the gimbal 17 according to the proportional-integral-derivative (PID) control law such that the deviation of the input signals from a zero value in the corresponding PID-controllers of the angular velocity stabilization unit 11 are minimized. At the input of the PID-controllers, phasecorrection transfer functions may be applied for increasing the accuracy of the stabilization system during dynamic operation conditions. The orientation stabilization unit 8 calculates correction signals ωx_cor, ωy_cor, and ωz_cor (FIG. 1) in the form of reference angular velocities in the CCS, based on the difference between the current and reference orientation values. These signals are summed with the corresponding measured angular velocities in the adder unit 9. The orientation of the movie camera 22 is calculated in the inertial measurement unit 1 using the readings of 3 (three) angular velocity sensors (gyroscopes) and 3 (three) accelerometers which have sensitivity axes that coincide with the CCS. The control unit 15 of the first frame of the gimbal is a cascade control loop that consists of the three PID-controllers, with the first PID-controller minimizing the positional deviation of the third frame 20 from its central position, the second PID-controller minimizing the relative angular velocity of the third frame 20, and the third PID-controller being a controller for controlling the relative velocity of the first frame 18 that is calculated as a derivative of the readings θ1 of the encoder 2 (FIG. 1) of the first frame 18. To provide the same dynamic performance of the gimbal 17 depending on the relative position of the second frame 19, the first PID-controller has a gain that is variable according to a cosinusoidal law. An output value M1_ref (FIG. 1) of the control unit 15 of the first frame of the gimbal is, in turn, a reference torque for the control system unit 16 of the motor 28 of the first axis 21.

The description of the operation of the control system also testifies to the invariant character of the operation of the gimbal 17 relative to the orientation of its mounting point. The only one technical requirement is to have rotational devices on the first axis 24 and on the fourth axis 27 for the continuous transmission of information signals of the sensors and for their powering, as well as power lines for the control system units 12, 13, 14, 16 of the motors 28, 29, 30, 31. The additional application of this requirement for the second axis 25 allows one to control the rotation of the movie camera 22 around any arbitrary axis in the inertial space in an unlimited fashion.

The set of all essential features of the proposed movie camera stabilization and control system, including its novel essential features, allow one to achieve the technical effect when using these features. Namely, due to the fact that the proposed movie camera stabilization and control system consists of the above-described two individual sub-systems which are independent from each other and do not require dynamic conversions to calculate the control torques of the motors, it becomes possible to significantly improve the movie camera stabilization and control system based on the four-degree-of-freedom gimbal in the inertial space by reducing the number of calculation operations and simplifying its adjustment.

The positive technical effect of the proposed movie camera stabilization and control system also consists in expanding the usage field of the device (the four-degree-of-freedom gimbal in the combination with the proposed movie camera stabilization and control system) due to the possibility of its arbitrary mounting, in particular, on cinematographic telescopic cranes, providing the possibility of performing the rotation of the movie camera around an arbitrary axis in the space in the unlimited fashion, as well as simplifying the control system and the adjustment procedure of the control system due to the reduction of the number and complexity of the calculation operations. Said advantages also allow one to use more compact and less expensive electronic components as compared to analogous devices.

The proposed movie camera stabilization and control system has been extensively tested during its experimental production, as well as in the process of its operation when performing cinematographic and other footage.

The results of the tests have shown that the design of the proposed movie camera stabilization and control system operates effectively in the combination with the design of the four-degree-of-freedom gimbal and different types of movie cameras.

The examples of the specific industrial implementation of the proposed invention and their use are given above as the best exemplary embodiments.

The proposed movie camera stabilization and control system meets all the requirements for its operation and use, as well as the commonly accepted safety rules for use of such systems.

The invention claimed is:

1. A movie camera stabilization and control system, comprising:
    a gimbal that comprises four frames which are successively connected to each other and have mutually perpendicular rotation axes,
    four encoders,
    four electrical motors which are mounted on the rotation axes of the frames,
    an inertial measurement unit that is mounted on a platform for mounting a movie camera,
    an operator console unit, and
    a control system,
    wherein the control system consists of two individual sub-systems comprising:
    a first individual sub-system for stabilizing and controlling an angular velocity of the movie camera in an inertial space by means of the three inner frames of the gimbal, the sub-system being made as three control loops based on proportional-integral-derivative (PID)-controllers to minimize a projection of a sum of reference angular velocities and angular velocities measured by the inertial measurement unit on an axis of the corresponding motor, and
    a second individual sub-system that is made as a cascaded control loop for controlling a relative velocity of the first frame based on three PID-controllers comprising:
    a first PID-controller that is a controller for minimizing a deviation of the third frame from a central position of the third frame and has a gain that is variable according to a cosinusoidal law depending on a relative angular position of the second frame of the gimbal,
    a second PID-controller that is a controller for minimizing a relative angular velocity of the third frame, and
    a third PID-controller that is a controller for controlling a relative angular velocity of the first frame,
    wherein said two individual control sub-systems are independent from each other, do not require dynamic conversions when calculating reference torques of all the motors and information about moments of inertia of the gimbal and the movie camera.

2. The movie camera stabilization and control system according to claim 1, further comprising the following units which are related to the first sub-system for stabilizing and controlling the angular velocity of the movie camera in the inertial space:
    a reference angular velocity calculation unit,
    an angular velocity conversion unit,
    an angular velocity stabilization unit,
    control system units of the motors of a second axis, a third axis, and a fourth axis of the gimbal, respectively, and an orientation control unit, wherein the inertial measurement unit provides the angular velocity conversion unit with information about angular velocities in a coordinate system that is associated with the movie camera, as well as with data about an orientation of the movie camera in an inertial coordinate system (ICS), wherein the encoders are mounted on the axes of the gimbal and determine an orientation of a camera coordinate system (CCS) relative to a motors coordinate system (MCS) according to angular positions of the frames of the gimbal relative to each other, wherein the MCS is defined as a coordinate system (CS) having axes that coincide with a current position of the second axis, the third axis, and the fourth axis of the gimbal, wherein values of projections of the angular velocities set by the operator console unit on the axes of the CCS are determined in the reference angular velocity calculation unit, and the projections are summed in an adder unit with the corresponding angular velocities measured in the CCS by the inertial measurement unit, and projections of the corresponding values calculated in adder unit on the axes of the MCS are determined in the angular velocity conversion unit using data about angular positions of the frames of the gimbal relative to each other, which are measured by the encoders and the angular velocity stabilization unit receives, as input information, the projections of the angular velocities calculated in the angular velocity conversion unit and determines reference torques for the control system units of the corresponding motors and of the second axis, the third axis, and the fourth axis of the gimbal, respectively, wherein the angular velocity stabilization unit consists of three independent control loops based on PID-controllers which minimize a deviation of input signals from an output of the angular velocity conversion unit, wherein the orientation stabilization unit is auxiliary and forms additional correction signals as reference angular velocities in the CCS based on a difference between current and reference orientation values, the reference angular velocities being summed with the corresponding measured angular velocities in the adder unit, and the orientation of the movie camera is determined in the inertial measurement unit using readings of three gyroscope sensors and three accelerometers which have sensitivity axes that coincide with the CCS, wherein the control system unit of the first frame of the gimbal and the control system unit of the motor of the first axis are related to the second individual subsystem, wherein the control system unit of the first frame of the gimbal is a cascade control loop that comprises the three PID-controllers comprising:

the first PID-controller that minimizes the deviation of the third frame from the central position of the third frame, the second PID-controller that minimizes the relative angular velocity of the third frame, and the third PID-controller that is a controller for controlling the relative velocity of the first frame, wherein the first PID-controller has a gain that is variable according to the cosinusoidal law depending on the relative angular position of the second frame, and an output value of the control unit of the first frame of the gimbal is a reference torque for the control system unit of the motor of the first axis.

* * * * *